UNITED STATES PATENT OFFICE.

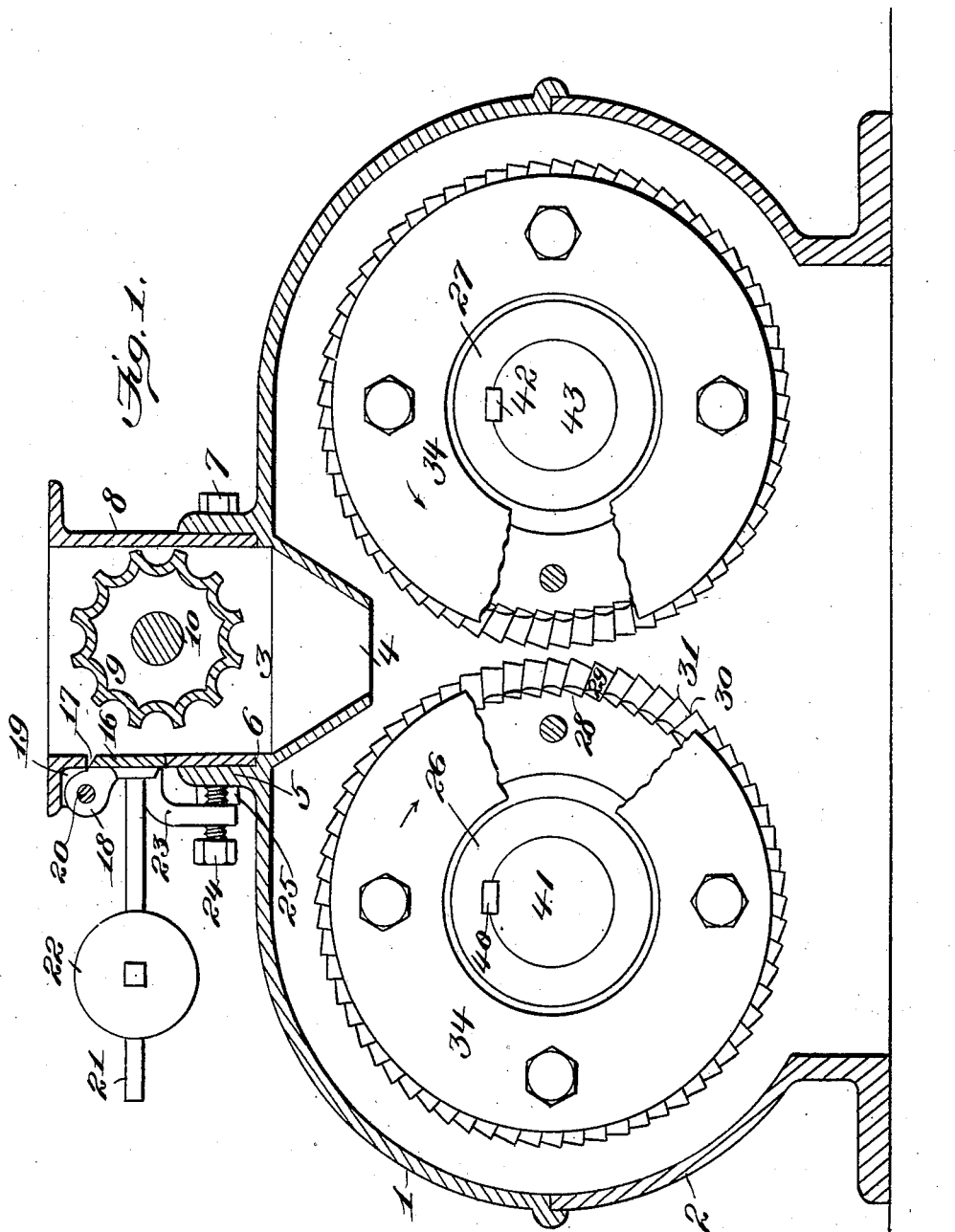

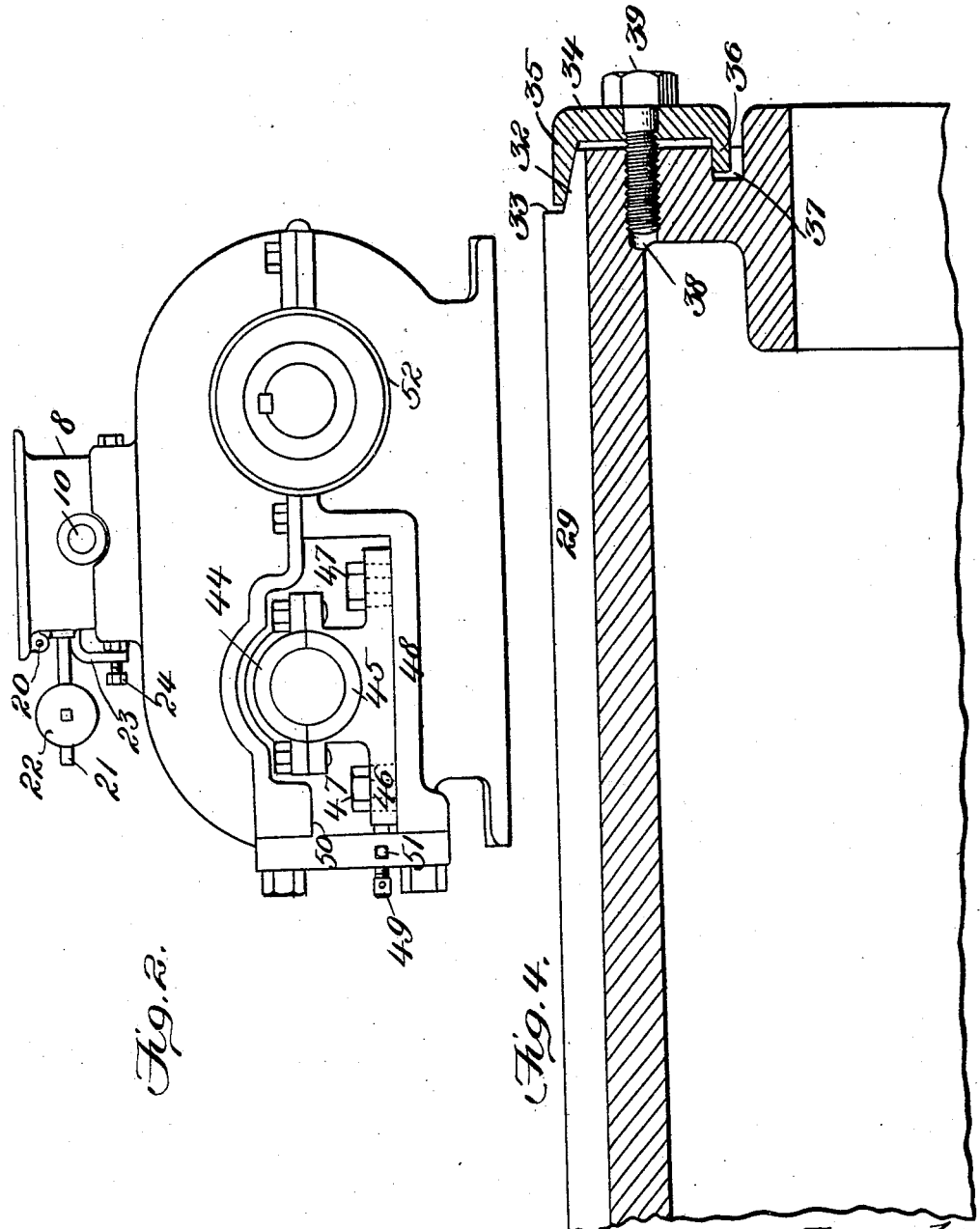

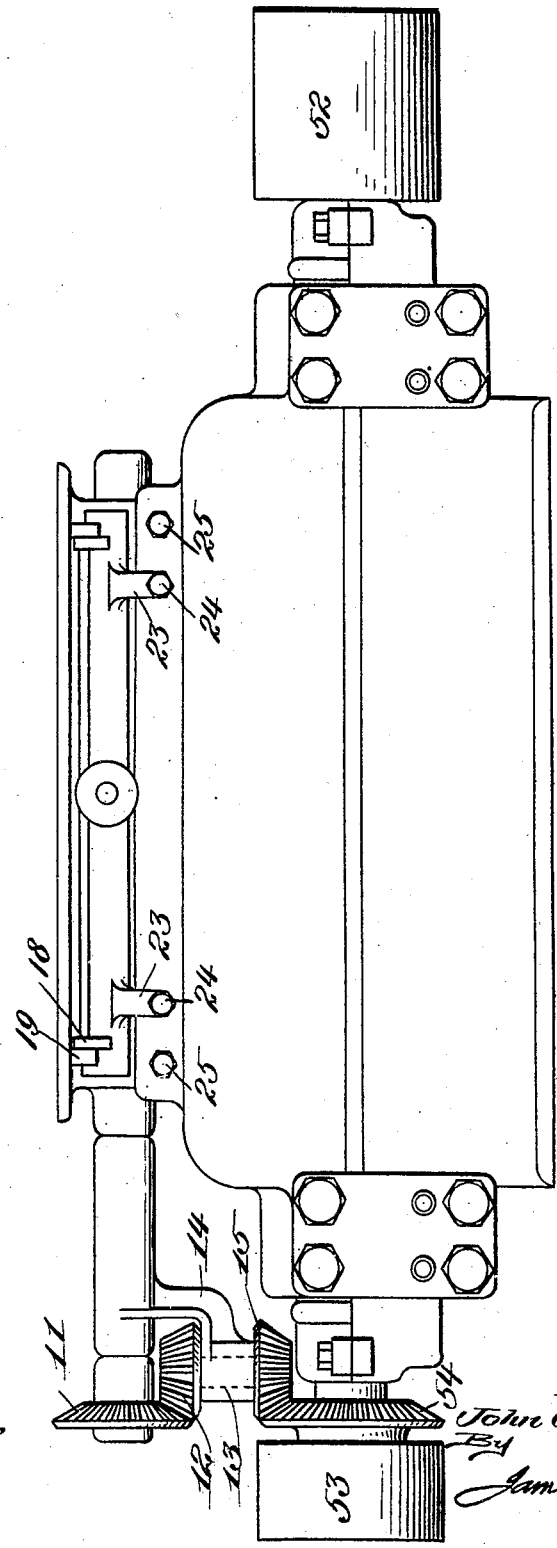

JOHN C. GEBHART, OF ATLANTA, GEORGIA, ASSIGNOR OF ONE-HALF TO DANIEL C. LYLE, OF COLLEGEPARK, GEORGIA.

COTTON-SEED HULLER.

No. 864,128.        Specification of Letters Patent.        Patented Aug. 20, 1907.

Application filed October 2, 1906. Serial No. 337,146.

*To all whom it may concern:*

Be it known that I, JOHN C. GEBHART, a citizen of the United States, residing at Atlanta, in the county of Fulton and State of Georgia, have invented new and useful Improvements in Cotton-Seed Hullers, of which the following is a specification.

This invention relates to cotton seed hullers, and aims to provide, in a manner as hereinafter set forth, a machine of such class whereby the breaking of the oil cells during the cutting of the hulls is reduced to a minimum, thereby obtaining a saving in oil.

Furthermore, the machine is so set up and arranged that during the operation of cutting the hulls no grinding action is present, consequently preventing the formation of meal. The formation of the meal breaks up most of the oil cells in the meats of the seed, and consequently there is a loss of oil, and, furthermore when the fine meal is formed it is very hard to separate it from the hulls. These objectionable features are overcome by a machine constructed in accordance with this invention.

The invention further aims to provide a cotton seed huller which shall be simple in its construction and arrangement, strong, durable, efficient in its use, having the cutting knives reversible so as to embody in their construction a pair of cutting edges, means for obtaining a uniform feed, readily set up and comparatively inexpensive to manufacture.

With the foregoing and other objects in view, the invention consists of the novel construction, combination and arrangement of parts hereinafter more specifically described and illustrated in the accompanying drawings, which form a part of this specification and wherein is shown the preferred embodiment of the invention, but it is to be understood that changes, variations and modifications can be resorted to which come within the scope of the claims hereunto appended.

In describing the invention in detail reference is had to the accompanying drawings, wherein like reference characters denote corresponding parts throughout the several views, and in which—

Figure 1 is a sectional elevation of a cotton seed huller in accordance with this invention. Fig. 2 is an end view. Fig. 3 is a side view. Fig. 4 is a detail showing one end of a cutting cylinder with a means for securing one end of the cutters in position.

Referring to the drawings by reference characters the machine casing is formed of two sections 1 and 2, the latter being open at its bottom and the former having a centrally arranged opening 3 with a guide chute 4 depending therefrom. The section 1, approximately centrally thereof, is furthermore provided with a vertically-extending rectangular flange 5, which is shouldered as at 6. Seated against the shoulder 6 and connected to the flange 5 through the medium of the hold-fast devices 7, is a feed box 8, open at its top and bottom and in which is arranged a corrugated feed roller 9 carried by the shaft 10, the latter being journaled eccentrically in the ends of the box 8 and projects from one end of the box 8 and carries on its projecting end a beveled gear 11, which meshes with the beveled pinion 12 carried upon the upper end of a vertical shaft 13 extending through a bracket 14 projecting from the machine frame. The lower end of the shaft 13 carries a beveled pinion 15. One side of the box 8 is provided with doors 16, an opening 17 being provided in the wall to receive the door. The door 16 is formed with ears 18, which are pivotally connected to the studs 19 formed integral with the box. The pivots between the ears 18 and the lugs 19 are indicated by the reference character 20.

Arranged centrally of the door 16 and extending therefrom in a lateral manner is a bar 21, carrying a counter-weight 22, the function of which is to hold the door against the material passing through the box 8. The door 16 is furthermore provided with a pair of curved arms 23, which are apertured at their lower ends and are adapted to receive the regulating screws 24. The arms 23 and screws 24 determine the position of the door 16. The function of the door 16 is to regulate the movement of the material being fed to the cutting rolls to be hereinafter referred to. The nut 25 constitutes a stop for the inward movement of the door, which will be caused by the counter-weight 22. The door 16 swinging in the box 8 to a greater or less extent regulates the passage of the material between the feed roller and the door as will be evident. The door is of such length as to be substantially equal to the length of the box 8.

Arranged within the machine casing is a pair of longitudinally-extending cutter rolls 26, 27, the latter rotating at a much greater rate of speed than the former. The rolls 26, 27 are so positioned that the discharge chute 4 will be arranged directly above the space formed between the two rolls. The roll 26 is adjustable to and from the roll 27 so as to increase or decrease the width of the space between the two rolls. The manner of adjusting the roll 26 will be hereinafter referred to. The periphery of each of the cutter rolls is provided with a plurality of longitudinally-extending seats arranged in a step-like manner, as at 28, and the said seats are adapted to receive a longitudinally-extending cutter bar 29, having a pair of cutting edges 30, 31, but one of the cutting edges being in operation at one time. Each of the cutter bars is solid, is slightly offset from a lateral line struck from the center of the roll, rectangular in cross section and has a tendency to be slightly wedge-shaped. When the cutter bars are in position they abut against one another and snugly engage the seats 28, and owing to the manner in which the seats 28 are arranged upon the periphery of the cutter rolls the cutter bars are also positioned in a step-like manner, offering but one cutting edge for operating purposes at one time. The cutter bars 29 are chamfered at each end so as to reduce each end, as at 32, and shouldered, as at 33, and engaging the reduced portions at each end of the cutter bars 29 is a clamping member 34, which is formed with an angularly-extending portion 35 having a beveled inner face which contacts with the reduced portion at the end of the cutter bars, and the said clamping member is furthermore provided with an inwardly-extending flange 36 adapted to engage in a recess 37 formed in the cutter roll head.

The cutter bars upon the roll 26 are arranged in a reverse manner with respect to the cutter bars upon the roll 27 so that no grinding action will be had upon the seed bars cutting the same. The cutter roll is furthermore provided with a plurality of screw-threaded recesses 38 adapted to receive the hold-fast devices 39, which extend through the clamping member 34. The hold-fast devices 39 detachably secure the clamping members in position so that they will clamp the cutter bars fixedly to the seats 28 of the cutter rolls. The cutter roll 26 is splined, as at 40, to the shaft 41 and the cutter roll 27 is splined as at 42, to the shaft 43. The shaft 41 projects from each end of the machine casing and is journaled in adjustable bearings. Each of the adjustable bearings consists of an upper section 44 and a lower section 45, clamped together and said lower section 45 is formed with a pair of laterally-extending lugs 46 provided with slots through which extend the removable hold-fast devices 47, the latter engaging in a ledge 48 formed on the machine frame and which constitutes a support for the bearing. With each of the bearings the adjusting screws 49 are connected and extend through vertical plates 50 secured by the hold-fast devices 51 to the ledge 48. Set screws 51 are provided for retaining the screws 49 in their adjusted position.

The shaft 43 is mounted in suitable bearings at each end of the machine casing and one end of shaft 43 carries a drive pulley 52. The shaft 41 carries a drive pulley 53 and also a beveled gear 54, which meshes with the beveled pinion 15 and by such arrangement the shaft 41 of the cutter roll 26 drives the feed roll 9.

Owing to the manner of arranging the cutter bars on the cutter rolls the cutter bars form a solid staving around the rolls and are so positioned that but one of the upper square edges which form a cutting edge engages the hulls. If the said cutting edge should become dull the cutter bar can be reversed, end for end, and the other upper square edge of the bar be employed as a cutting edge, consequently by such an arrangement both of the upper square edges of each of the bars can be used with but one grinding.

By the employment of the cutting bars in a manner as stated and the rotating of one of the cutter rolls at a greater rate of speed than the other roll the seeds are not ground, but the cutting bars cut the hulls open and the majority of the meats are halved and the said bars do not cause the making of meal owing to the fact that there is no apparent grinding action present. If any grinding action is present it is very small. Owing to the fact that the seeds are not ground the breaking of the oil cells is reduced to a minimum and which prevents the loss of oil by absorption, by the hulls and small lint which is left in the hull, and furthermore a much better separation can be obtained for the reason that the seeds are cut open and not crushed or ground.

What I claim is—

1. A cotton seed huller comprising a casing, cutter rolls rotatably mounted in the casing and provided with peripheral steps, a continuous annular series of abutting wedge-shaped cutter bars arranged in said steps, said rolls having an annular recess on each side thereof, clamping members with inwardly projecting flanges engaging said recesses and bars, and means for securing said clamping members in a fixed position.

2. A cotton seed huller comprising a casing, cutter rolls rotatably mounted in the casing and provided with peripheral steps, a continuous annular series of abutting wedge-shaped cutter bars having their ends chamfered and shouldered and arranged in said steps, said rolls having an annular recess on each side thereof, clamping members having inwardly projecting flanges, one of said flanges having a reduced tapered extremity engaging the chamfered and shouldered ends of said cutter bars and the other flange being adapted to engage said recess, and means for securing said clamping members in a fixed position.

3. A cotton seed huller comprising rotatable cutter rolls, cutter bars arranged around the periphery of each of the rolls, said rolls having an annular recess on each side thereof, clamping members with inwardly projecting flanges engaging said recesses and bars, and means for securing the said clamping members in a fixed position.

In testimony whereof I have hereunto set my hand in presence of two subscribing witnesses.

JOHN C. GEBHART.

Witnesses:
H. MIMS,
C. T. MERIWETHER.